June 24, 1958  H. I. ZELTZER ET AL  2,840,073
BINOCULAR VISUAL TRAINING DEVICE
Filed May 6, 1957
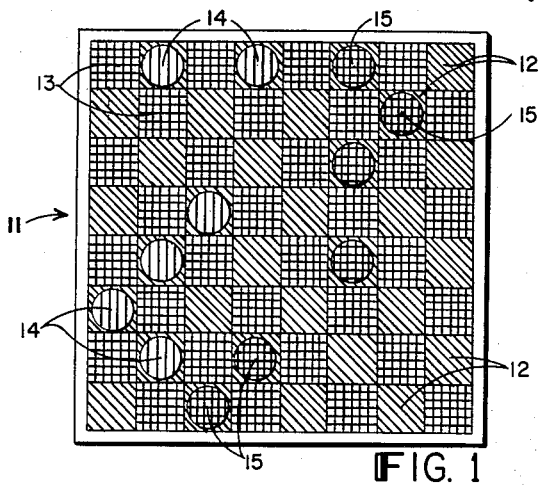
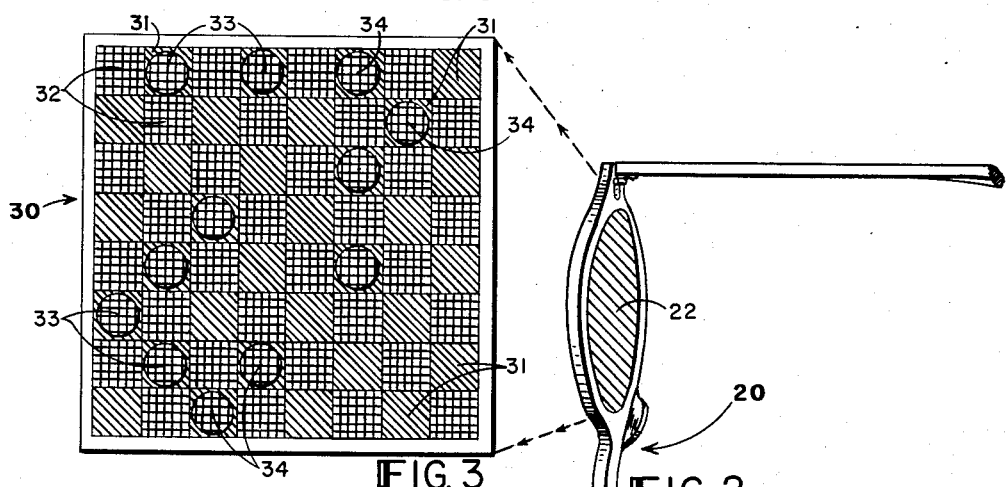
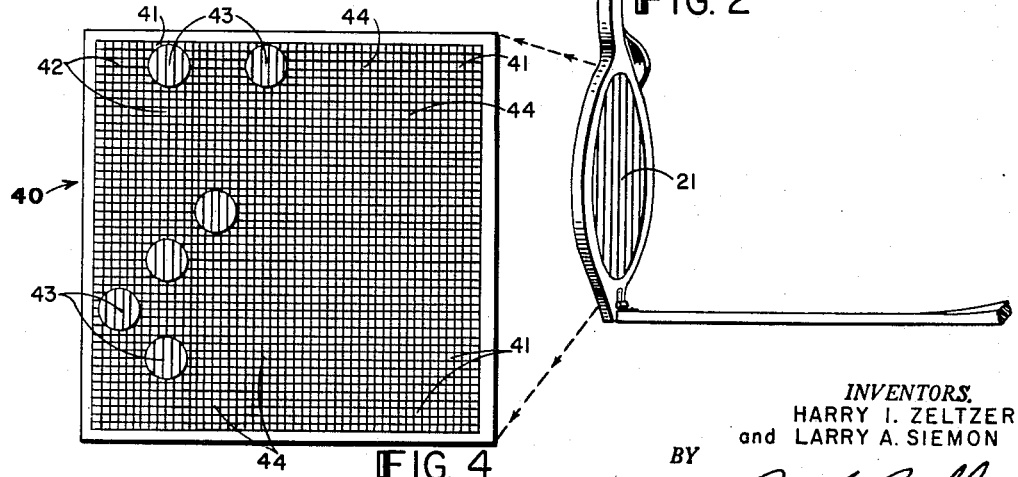
*INVENTORS.*
HARRY I. ZELTZER
and LARRY A. SIEMON
BY
ATTORNEY.

United States Patent Office 2,840,073
Patented June 24, 1958

2,840,073

BINOCULAR VISUAL TRAINING DEVICE

Harry I. Zeltzer, Waltham, and Larry A. Siemon, Boston, Mass.

Application May 6, 1957, Serial No. 657,293

4 Claims. (Cl. 128—76.5)

This invention relates to optical treating devices and more particularly to binocular visual training devices for aiding in the learning of vision.

Vision is a learning process. When the child is born, his vision is elementary. As he grows, he learns, substantially in order, the monocular skills of fixation, rotation, projection, hand and eye coordination and focusing. At some point in this monocular training he begins to coordinate these monocular skills and develop binocular vision, which includes, as a step, the fusion of images. A number of individuals often fail to normally learn to fuse images and instead develop their own way of vision. The reasons thereof are complex, and often have a psychological background. Aid is thus required to help the individual develop the proper fusion skill.

Present visual training of this sort for the most part is aided by the use of complicated machines using transparencies, mirrors, rotating prisms and similar components. However, these devices require but cannot obtain a high level of attention for effectiveness.

A primary object of our device is to provide high level attention training devices for binocular vision.

Our invention is in the form of games, the players of which are involuntarily forced to use both eyes. Such games stimulate interest particularly in children where other clinical devices cause boredom and demand a high level of attention and supervision. Those who have partial binocularity, particularly those who do not fuse images properly, will generally find these games beneficial. This invention teaches a player to use both eyes on a subconscious level.

These games may be certain conventional games of specified construction. There are no additional complicated, or moving parts required. They are games generally known and familiar to children and adults and may be any game wherein the component parts or portions of the component parts are in colors, the elimination of one of such colors rendering the playing of the game inoperative to at least one of the players.

Further objects, advantages and a fuller understanding of the invention will hereinafter appear from the following description of one embodiment illustrative of the invention and shown in the accompanying drawings in which Fig. 1 is a plan view of a checker board showing green playing squares, black background squares, red game pieces and black game pieces.

Fig. 2 shows a perspective view of a pair of spectacles having one red transparent filter lens and one green transparent filter lens.

Fig. 3 shows the resulting color effect to the viewer of the board shown in Fig. 1 when viewed through the green lens only and in which all game pieces appear black.

Fig. 4 shows the resulting color effect to the viewer of the board shown in Fig. 1 when viewed through the red lens only and in which everything appears black except for the red game pieces.

The device shown as one embodiment consists of a bi-color target comprising a conventional checker board with green squares (color A) and black squares, and with red game pieces (color B) and black game pieces. Associated viewing spectacles are provided, each pair of which have one matching green lens (color D) and one matching red lens (color C), these lenses constituting transparent, contrasting color, filter lenses. Colors B and C are the same, and colors A and D are the same.

Referring to the drawings the device shown in Fig. 1 comprises a target having a game board 11, divided into green playing squares 12, and black background squares 13, red game pieces 14 and black game pieces 15.

This board is to be viewed by the learner through spectacles 20 with one red transparent filter lens 21 and one green transparent filter lens 22 as shown in Fig. 2.

In Fig. 3 we see the board 30 as viewed through the green lens 22. As a result, the green squares 31 appear green, while the black squares 32, the red pieces 33 and the black pieces 34 all appear to be black and indistinguishable one from the other.

When viewed through both lenses, the board again appears normal as in Fig. 1.

Thus a learner player, wearing the bi-color spectacles and playing a game, the colors on which are cooperatively associated with the color of the spectacle lenses as described above, is forced into simultaneous perception by the use of both eyes in order that he may see the complete target and to see it in the original colors, as it would be viewed by a fellow player not wearing the colored spectacles. The colors of the lenses are such that each color is transmitted by the lens of similar color and occluded by the lens of the differentiating color.

While one embodiment of our invention has been described in detail, it will be understood that we do not wish to be limited to the particular construction set forth, since various changes in the form, material, proportions and arrangement of parts, and in the details of construction may be resorted to without departing from the spirit and scope of the invention, or destroying any of the advantages contained in the same, heretofore described and defined in the following claims.

We claim:

1. A device for aiding the learning of binocular vision, comprising a two-color game board comprised of colors A and black, game pieces of colors B and black, and at least one pair of spectacles containing a transparent filter C for one eye and a transparent filter D for the other eye; filter C substantially transmitting color B but not color A; filter D substantially transmitting color A but not color B.

2. A game for aiding the learning of binocular vision comprising a target having a game board divided into a playing area and a background area, game pieces, and at least one pair of spectacles worn by a learner player, said spectacles having a different color transparent filter for each eye, said background area being black, said playing area being of a color substantially transmitted by one filter and substantially occluded by the second filter, at least one of said game pieces being black, at least another of said game pieces being of a color substantially transmitted by the second filter and substantially occluded by the first filter.

3. A game as set forth in claim 2 wherein said transmission and occlusion of color by the joint use of said lenses produce an image of said target in original colors.

4. A game for aiding the learning of binocular vision comprising a target having playing areas, background areas, and game pieces, and at least one pair of spectacles worn by a player; said spectacles having transparent filter lenses each of a different color other than black, at least one of said game pieces having the color of one of the lenses and at least one other of said games pieces having a color other than the colors of said lenses, the color of the playing areas having the color of the other of said lenses, and the color of the background areas having a color other than the colors of said lenses, each eye of the wearer seeing only that portion of said target having the same color as the filter through which it is viewed; the use of both eyes and associated filters resulting in a view of the complete target in original colors.

References Cited in the file of this patent

UNITED STATES PATENTS

| | | |
|---|---|---|
| 2,618,259 | Alexander | Nov. 18, 1952 |
| 2,748,764 | Boyd | June 5, 1956 |